United States Patent
Frei et al.

(10) Patent No.: US 7,697,516 B2
(45) Date of Patent: Apr. 13, 2010

(54) METHOD AND APPARATUS FOR PRE-ADMITTING A NODE TO A MESH NETWORK

(75) Inventors: Randall Wayne Frei, San Jose, CA (US); Linker Cheng, San Jose, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 734 days.

(21) Appl. No.: 11/372,952

(22) Filed: Mar. 10, 2006

(65) Prior Publication Data
US 2007/0030847 A1 Feb. 8, 2007

Related U.S. Application Data

(60) Provisional application No. 60/704,705, filed on Aug. 2, 2005.

(51) Int. Cl.
*H04L 12/28* (2006.01)
(52) U.S. Cl. ...................................... 370/389
(58) Field of Classification Search ................. 370/389, 370/330, 351, 392; 709/223–231
See application file for complete search history.

(56) References Cited

U.S. PATENT DOCUMENTS

| | | | | |
|---|---|---|---|---|
| 6,788,665 | B1 * | 9/2004 | Vancraeynest | 370/337 |
| 6,850,502 | B1 * | 2/2005 | Kagan et al. | 370/330 |
| 2002/0049062 | A1 | 4/2002 | Petersen | |
| 2004/0039817 | A1 | 2/2004 | Lee et al. | |
| 2004/0214570 | A1 | 10/2004 | Zhang et al. | |
| 2004/0240412 | A1 * | 12/2004 | Winget | 370/331 |
| 2005/0198337 | A1 * | 9/2005 | Sun et al. | 709/230 |
| 2007/0258508 | A1 | 11/2007 | Werb et al. | |

FOREIGN PATENT DOCUMENTS

EP 0999717 A2 5/2000

OTHER PUBLICATIONS

Paramir Bahl and Venkata N. Padmanabhan, RADAR: An In-building RF-based User Location and Tracking System, Mar. 2000, 19th Annual Joint Conference of the IEEE Computer and Communications Societies Proceedings, vol. 2, pp. 775-784.*
Sanzgiri, Kimaya et al., "Determing Intra-Flow Contention along Multihop Paths in Wireless Networks", *Broadband Networks*, 2004. BroadNets 2004. Proceedings. First International Conference on, 2004, 611-620.
Supplementary European Search Report mailed Aug. 24, 2009 for European Application No. 06788760.4.
Zhu, Jing & Sumit, Roy, "802.11 Mesh Networks with Two-Radio Access Points," IEEE International Conference on Communications, 2005 (ICC 2005), Seoul, Korea, May 16-20, 2005. IEEE, vol. 5, May 16, 2005, pp. 3609-3615.

* cited by examiner

*Primary Examiner*—Pankaj Kumar
*Assistant Examiner*—Gautam Sharma
(74) *Attorney, Agent, or Firm*—Moser IP Law Group

(57) ABSTRACT

A method and apparatus for admitting an additional node into a communications network that uses a scheduled communications protocol. Specifically, the node detects the presence of a network, establishes a communication link with a node already present on the network using a unicast messaging protocol, and then communicates pre-admission information to the node on the network. After pre-admission is complete, the new node is admitted to the network.

21 Claims, 4 Drawing Sheets

METHOD AND APPARATUS FOR PRE-ADMITTING A NODE TO A MESH NETWORK

CROSS-REFERENCE TO RELATED APPLICATIONS

This application claims benefit of U.S. provisional patent application Ser. No. 60/704,705 filed Aug. 2, 2005, which is herein incorporated by reference.

BACKGROUND OF THE INVENTION

1. Field of the Invention

Embodiments of the present invention generally relate to a communications network and, more particularly, to a method and apparatus for admitting a node to a network.

2. Description of the Related Art

A conventional network is comprised of nodes and a router, typically arranged in a hub and spoke formation. A node communicates to another node by transmitting the data to the router, and the router then forwards the data to the destination node. The nodes are unaware of the presence of all the other nodes present on the network, but the router is aware of the presence of all the nodes on the network. The router stores the physical address of all the nodes on the network and facilitates the transmission of data from one node to another.

A node is added to a conventional network by connecting the node to a router. Once the router detects the presence of the new node, the router stores the physical address of the node its memory. The nodes on the network communicate with the newly added node in a conventional manner: data addressed to the new node is transmitted to the router, and the router forwards the data to the physical address stored in memory that is associated with the new node.

In a multi-base station network, where a plurality of user nodes may wirelessly communicate with a base station, the communications protocol is generally a scheduled protocol. Using a scheduled protocol, the base station organizes the communications with each of the user nodes. When a new node requests a connection to the base station, the scheduled communications may be interrupted to process the request. Such an interruption may impact network throughput. In addition, the process to negotiate the admission of a new node may introduce latency into the communication experienced by the existing nodes of the network.

A mesh network differs from a conventional network because there is no central switching point, i.e., a router, to distribute the data within the mesh network. The nodes are aware of the presence of other nodes on the mesh network, and data is transmitted across the mesh network by passing the data through interconnected nodes. Since there is no central switching point to direct traffic on the mesh network, a node must join the mesh network by connecting to nodes that are already a part of the mesh network.

The nodes of a mesh network communicate with one another using specific time slots and communications protocols, i.e., the communications within the network are scheduled. A new node that is to be admitted to the network is unsynchronized with the network and must repeatedly request admission until a node that is currently part of the network recognizes the admission request. Consequently, a new node may wait an inordinate amount of time before being admitted to the network. Furthermore, the existing nodes of the network must interrupt their scheduled communications to process the admission request of a new node. Such interruption can impact the throughput of the network.

Therefore, there is a need in the art for an improved method and apparatus for admitting a node to a communications network.

SUMMARY OF THE INVENTION

The present invention is a method and apparatus for admitting an additional node into a communications network that uses a scheduled communications protocol. Specifically, the node detects the presence of a network, establishes a communication link with a node already present on the network using a unicast messaging protocol, and then communicates pre-admission information to the node on the network. After pre-admission is complete, the new node is admitted to the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
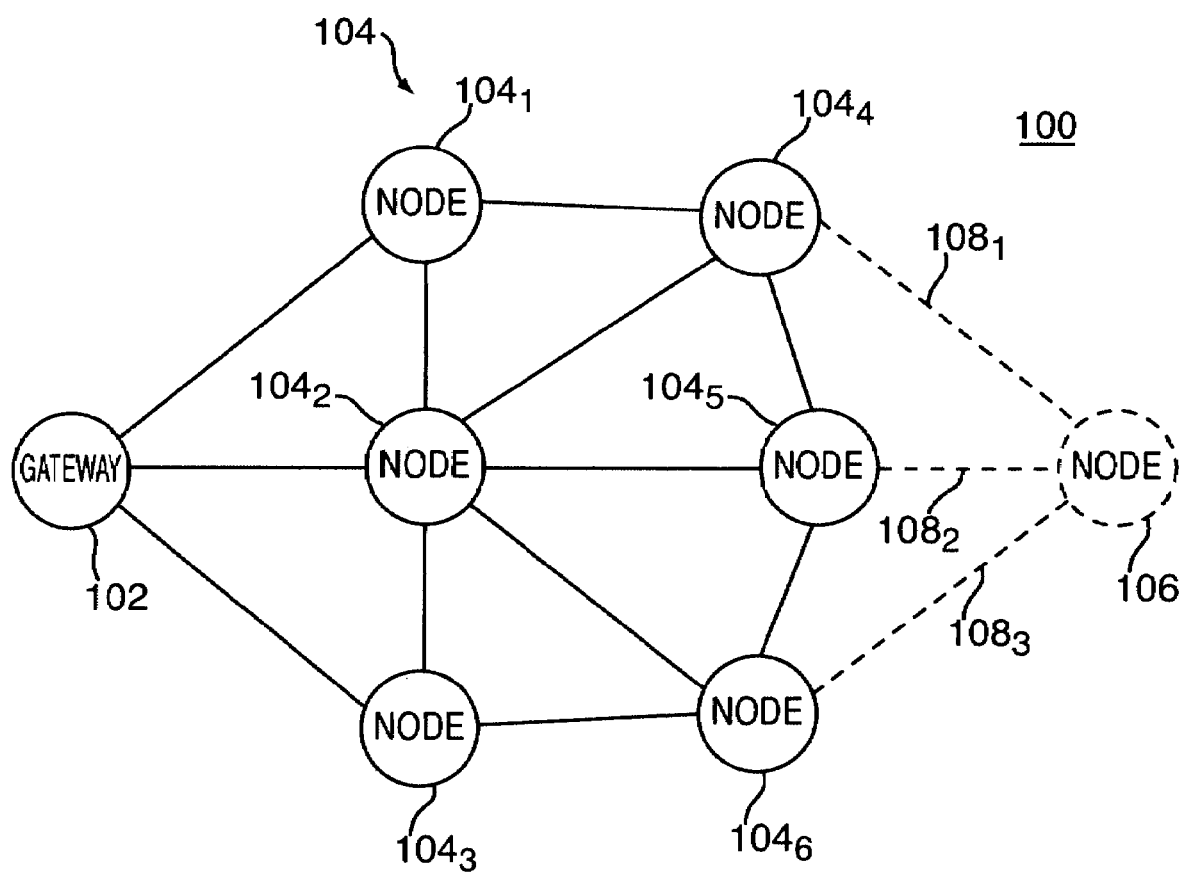
FIG. 1 is a graphical view of a communications network that uses a scheduled communication protocol.

FIG. 1 is a graphical depiction of one embodiment of a communications network 100 comprising a gateway 102 connected to nodes 104. In the depicted exemplary embodiment, the network is a mesh network; however, those skilled in the art will understand that the invention described herein benefits and may be used with any communications network that uses a scheduled communications protocol.

The nodes 104 are interconnected with each other such that multiple paths exist between each node 104 and the gateway 102. Each node 104 may operate in one of three modes: point-to-point, multi-casting and broadcasting. In a point-to-point mode, a node addresses one specific other node for a communication (i.e., a packet or sequence of packets are addressed to another node). In multi-casting mode, a node may transmit a communication to a specific plurality of other nodes. In a broadcast mode, a node transmits a communication without identifying a specific recipient node for the message. Communications are executed using packets of data that are transmitted within specific timeslots, i.e., a scheduled protocol. One such mesh network is described in U.S. patent application Ser. No. 10/122,883, filed Apr. 15, 2002 and U.S. patent application Ser. No. 10/122,886, filed Apr. 15, 2002, both of which are incorporated herein by reference.

In the depicted example, a new node 106 is attempting to join the mesh network 100. The new node 106 can communicate with Node $104_4$ over data path $108_1$, with Node $104_5$ over data path $108_2$ and with Node $104_6$ over data path $108_3$.

A node 106 (sometimes referred to as a "child" node) that seeks admission to a mesh network 100 does so by requesting admission to the network 100 using a "unicast message" that is carried by a potentially shared channel. The existing network nodes 104 (sometimes referred to as "parent" nodes) transmit information within a specific time slot once per frame. This information provides node identification information, and other node/network parameters. These messages form a "network advertisement" that provides the child node with information necessary to perform pre-admission processing as described below. More specifically, the child node 106 wishing to join the network listens for the unicast advertisement message(s) from the existing nodes of the network. The messages provide the neighbor node information as well as identifies the time for the unicast slot that can be shared such that a child node may communicate with the existing network nodes. The child node 106 can then send a pre-admission message in the designated unicast slot and "share" the channel.

The nodes 104 present on the mesh network 100 listen for a request to join the mesh network 100 within the designated slot for unicast messages. When a node $104_4$, $104_5$, $104_6$ present on the mesh network 100 detects such a request from a node 106 wishing to join the mesh network 100, the node $104_4$, $104_5$, $104_6$ on the mesh network 100 sends a specific reply message that is addressed to the node 106 seeking to join the mesh network 100. Since the nodes 106 and 104 have exchanged node identifier, these nodes can now "unicast" to one another using the designated slot. These pre-admission communications between parent and child nodes do not interrupt the ongoing communication support of the network that is performed by the parent nodes 104.

The messages initially contain the network identifier, the node identifier and other node parameters to the node $104_4$, $104_5$, $104_6$ on the mesh network 100. The node 106 then unicasts a pre-admission message to a node $104_4$, $104_5$, $104_6$. The node $104_4$, $104_5$, $104_6$ on the mesh network forwards the pre-admission message to the gateway 102. The gateway 102 then authenticates the node 106 and the node 106 becomes a part of the network 100. A detailed description of the admission process is presented below with respect to FIG. 4.

In other embodiments of the invention, i.e., a multi-base station network, the child node communicates with a base station using a pre-admission message. The decision to admit the child node to the network is performed by the base station without communicating to a gateway or any other network node.

The pre-admission communications occur in such a manner that the user communications performed by the parent node is not impacted by the admission negotiation. These pre-admission communications may occur in designated slots (as discussed above) or, alternatively, may occur using a separate low-bandwidth slotted protocol that is not related to the parent node user data network protocol. The pre-admission protocol may be separate and distinct from the user data protocol. As such, once the pre-admission negotiation is complete, the child node is "handed over" to the standard communication protocol to become a member of the network.

Figure 2:
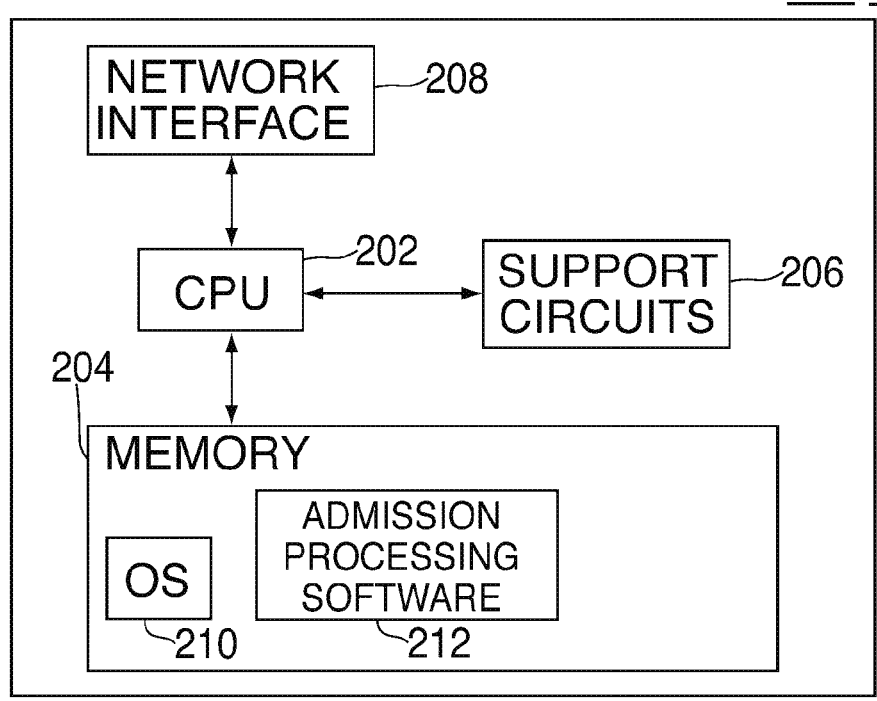
FIG. 2 is a block diagram of a node.

FIG. 2 is a block diagram of a node 104 or node 106. The node 104 comprises a CPU 202, support circuits 206, memory 204 and a network interface 208. The CPU 202 may comprise one or more readily available microprocessors or microcontrollers. The support circuits 206 are well known circuits that are used to support the operation of the CPU and may comprise one or more of cache, power supplies, input/output circuits, network interface cards, clock circuits, and the like. Memory 204 may comprise random access memory, read only memory, removable disk memory, flash memory, optical memory or various combinations of these types of memory. The memory 204 is sometimes referred to as main memory and may, in part, be used as cache memory or buffer memory. The memory 204 stores various forms of software and files, such as, an operating system (OS) 210 and admission processing software 212. The network interface 208 may be wired or wireless.

Figure 3:
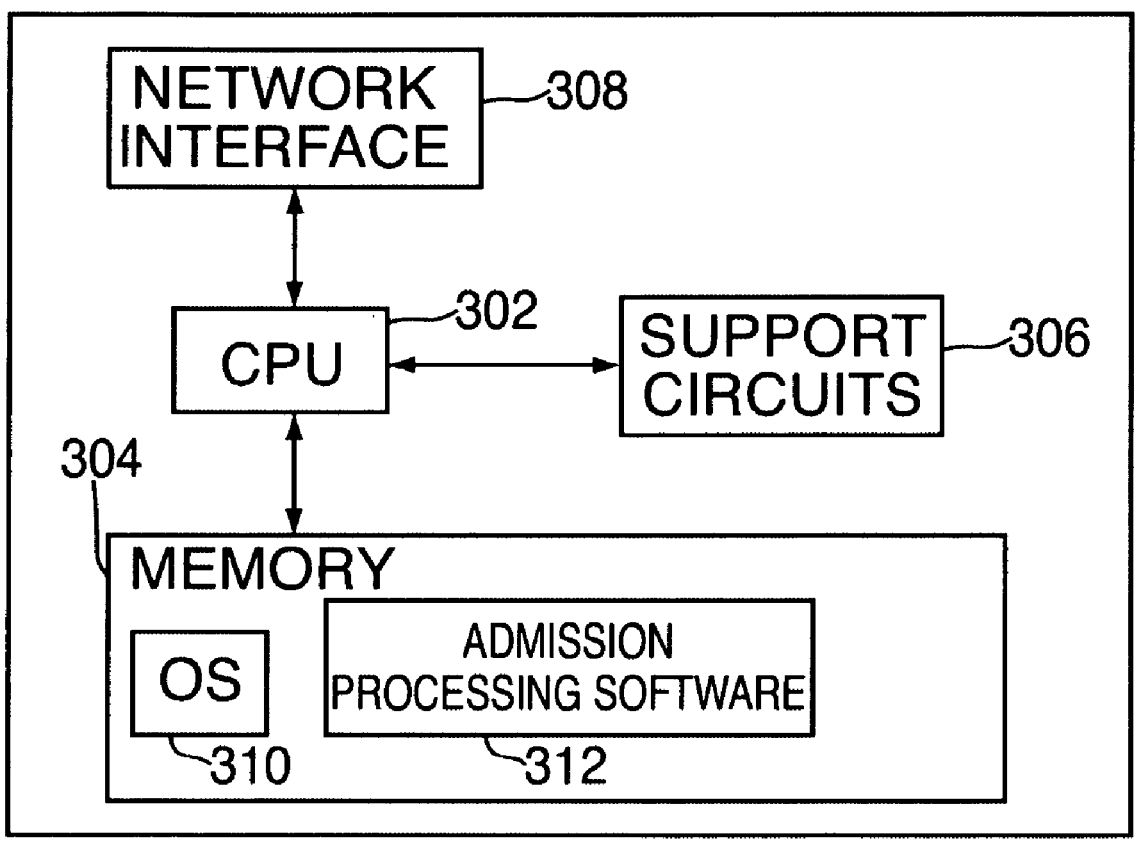
FIG. 3 is a block diagram of a gateway.

FIG. 3 is a block diagram of a gateway 102. The gateway 102 comprises a CPU 302, support circuits 306, memory 304 and a network interface 308. The CPU 302 may comprise one or more readily available microprocessors or microcontrollers. The support circuits 306 are well known circuits that are used to support the operation of the CPU 302 and may comprise one or more of cache, power supplies, input/output circuits, network interface cards, clock circuits, and the like. Memory 304 may comprise random access memory, read only memory, removable disk memory, flash memory, optical memory or various combinations of these types of memory. The memory 304 is sometimes referred to as main memory and may, in part, be used as cache memory or buffer memory. The memory 304 stores various forms of software and files, such as, an operating system (OS) 310 and admission processing software 312. The network interface 308 connects the gateway to the mesh network 100 as well as to a data backbone (not shown). The network interface 308 may be wired or wireless.

Figure 4:
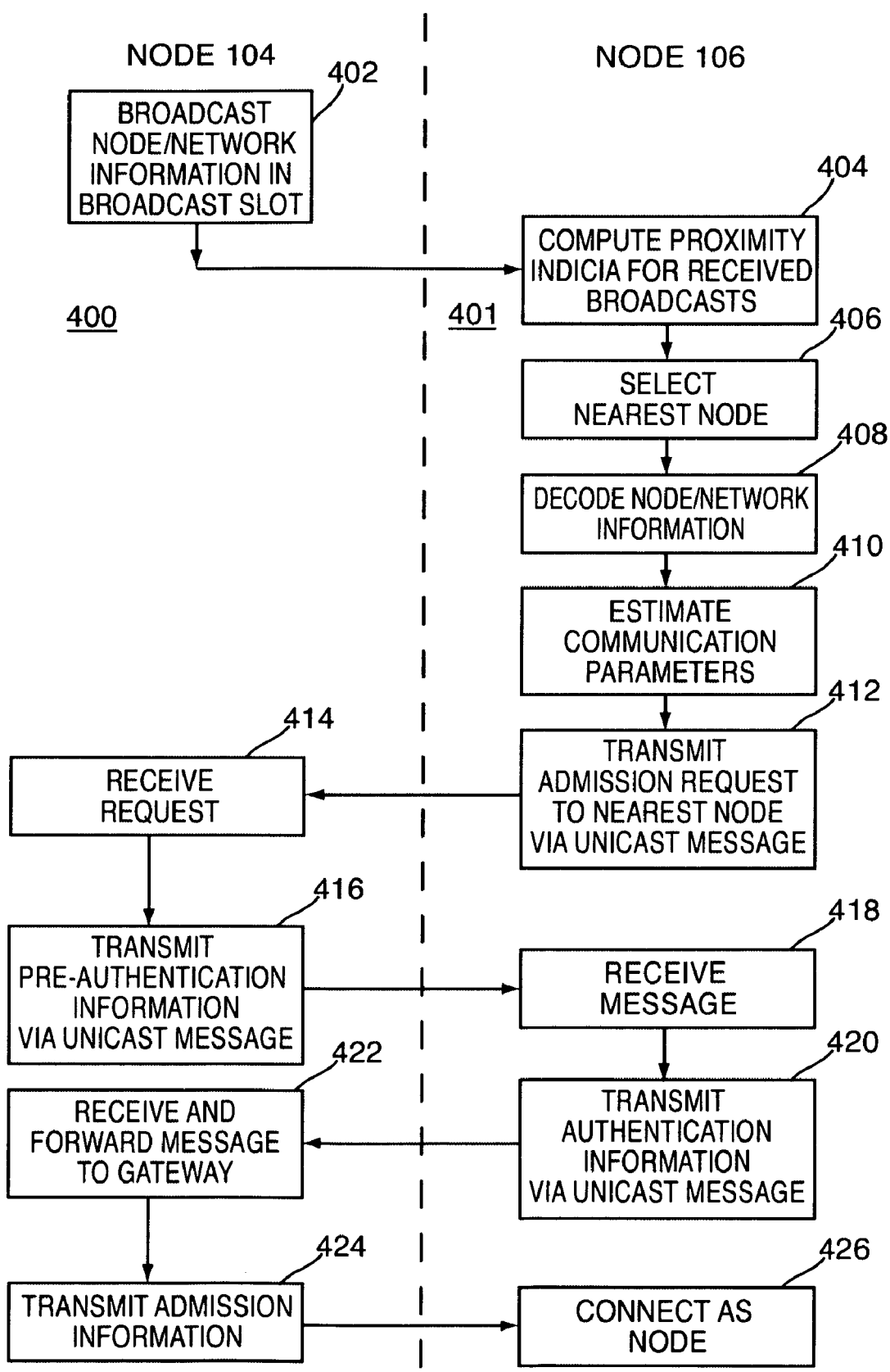
FIG. 4 is a flowchart detailing a method of implementing the present invention.

FIG. 4 depicts a flow chart of methods 400 and 401 of one embodiment of the operation of the present invention. To best understand the operation of the invention, the reader in encourage to simultaneously view FIGS. 1 and 4. Method 400 represents process steps performed by the node 104 executing its admission processing software and method 401 represents the process steps performed by the node 106 executing its admission processing software.

The method 400 begins at step 402 where the node 104 broadcasts or multicasts node/network information (a network advertisement message) in a designated slot. Although designated slots are synchronous within a frame used by a given node, they are asynchronously broadcast across the network. Consequently, various nodes will be broadcasting at different times commensurate with the local data frame timing. Thus, a node that receives such a broadcast from a particular frame may wait one frame period and transmit within the slot for that particular node to communicate with the node that sent the original broadcast. The node 106 that desires to enter the network must receive and process the advertisement messages, determine the "best" node to communicate with and then negotiate entry into the network. The communications to support the admission transaction are performed using the designated slots that define a shared unicast channel between the parent and child nodes.

At step 404, the child node 106 receives at least one advertisement message. Generally, the node 106 receives signals from a plurality of neighboring nodes 104. To determine the "best" node to contact and negotiate network admission, the method 401 computes proximity indicia for the received broadcasts. Generally, the node computes received signal strength information (RSSI) for each of the received broadcast signals. Other criteria may be used for determining link quality including successful transmission rate for packets, bit error rates, and the like. At step 406, the method 401 selects a node 104 having the "best" quality link to the child node 106, e.g., the node with the largest RSSI.

At step 408, the method decodes the node/network information that is sent in the broadcast message of the selected node.

At step 410, the node 106 estimates the parameters of a data link to the nodes detected on the network. The parameters of the data link may comprise the received signal strength of the link, the modulation rate of data on the link, the bit error rate of the link, node identification, network identification, or the physical distance over the link.

At step 412, the node 106 transmits a unicast message over the selected data link on a known slot. The message is a unicast message because it is addressed specifically to the selected node, i.e., the message is "tunneled" to the selected node 104. In one embodiment where the designated slots appears once per frame, the node 106 waits one frame period from the time of reception of the broadcast signal from the selected node 104, then transmits its unicast message. Consequently, the child and parent nodes begin communicating in a shared unicast channel.

At step 414, the selected node 104 receives the request for admission form the child node on the unicast channel. At step 416, the selected node 104 transmits pre-admission information via a unicast message to the node 106. This information is sufficient for the node 106 to receive information from the network. The pre-admission message may contain information regarding ranging, clock synchronization, one-way or two-way authentication, cryptographic information (key exchange), network configuration (e.g., routing information, congestion information, capacity information, and the like) and the like.

At step 418, the message is received and, at step 420, the node 106 transmits authentication information (passwords and other security information) through a unicast message to the node 104. The node 104, at step 422, forwards the authentication information to the gateway. At step 424, the node 104 transmits admission information received from the gateway to the node 106. This information will enable the node 106 to access database information regarding the network and optimize its transmission bandwidth. At step 426, the node 106 is admitted to the network, i.e., a switch-over or hand-over occurs where the child node is admitted to the network and can operate as a parent node.

If the network is a multi-base station network, then the base station (node 104) will decide to admit the child node without communicating to a gateway. Thus, a node may perform a pre-admission process in the background without impacting the "normal" network support of user communications provided by a network node, then using a single message, handover a newly admitted node to the network. The new node may be a user node or another base-station node.

The child nodes, in any of the embodiments described herein, may operate in another network until the pre-admission process is complete. As such, a child node with respect to one network may be a parent node with respect to another network. Once pre-admission processing is complete, the child node switches to a parent in the new network and disconnects from the other network.

While the foregoing is directed to embodiments of the present invention, other and further embodiments of the invention may be devised without departing from the basic scope thereof, and the scope thereof is determined by the claims that follow.

The invention claimed is:

1. In a mesh network comprising first and second network nodes that are operable to communicate using a scheduled communications protocol, a method for pre-admitting a given node to the mesh network via a link between the first network node and the given node, the method comprising:

listening, at the given node, for an advertisement message broadcast at a first time in a given slot of a communication channel between the first and second network nodes, wherein the advertisement message comprises an identifier of the first network node, transmitting, from the given node to the first network node in the given slot at a second time, a first unicast message comprising a request for negotiating pre-admittance to the mesh network; and exchanging, prior to handover to a protocol for admitting the given node to the mesh network, at least one second unicast message between the given node and the first network node, in the given slot at at least one third time, to exchange any of pre-admission information and pre-authentication information.

2. The method of claim 1, further comprising:

determining, from the advertisement message, indicia of proximity from the first network node;

selecting based upon the indicia of proximity, the first network node to communicate with via the at least one slot; and estimating communication parameters of the first network node.

3. The method of claim 2, wherein determining an indicia of proximity comprises: calculating received signal strength information for the first network node.

4. The method of claim 2, wherein the communication parameters of the first network node comprise: at least one parameter of a data link to the first network node, and wherein estimating communication parameters comprises estimating the at least one parameter using a link capacity of the data link.

5. The method of claim 1, wherein the advertisement message comprises any of at least one network parameter and at least one node parameter.

6. The method of claim 5, wherein any of the at least one network parameter and the at least one node parameter comprises a node identifier.

7. The method of claim 2, wherein exchanging at least one second unicast message comprises:

receiving, at the given node from the first network node in the given slot at a fourth time, a third unicast message that comprises the pre-admission information; and responsive to the third unicast message, transmitting to the first network node in the given slot at a fifth time, a fourth unicast message that comprises pre-authentication information.

8. The method of claim 1, further comprising: generating, at the given node for transmission to the first network node in given slot at a third time, a third unicast message for causing the handover to a protocol for admitting the given node to the mesh-network.

9. Apparatus for establishing pre-admittance with a mesh network via a link between a first network node of the mesh network, wherein the mesh network comprises the first network node and a second network node that are operable to communicate using a scheduled communications protocol, the apparatus comprising:

means for listening for an advertisement message broadcast at a first time in a given slot of a communication channel between the first and second network nodes, wherein the advertisement message comprises an identifier of the first network node;

means for determining, from the advertisement message, an indicia of proximity from the first network node;

means for selecting the first network node to communicate with, via the given slot, based upon the indicia of proximity;

means for estimating communication parameters of the first network node;

means for transmitting, to the first network node in the given slot at a second time, a first unicast message comprising a request for negotiating pre-admittance to the network; and means for exchanging, prior to handover to a protocol for admittance to the mesh network, at least one second unicast message with the first network node, in the given slot at at least one third time, to exchange any of pre-admission information and pre-authentication information.

10. The apparatus 9, wherein the means for determining an indicia of proximity comprises: means for calculating received signal strength information for the first network node.

11. The apparatus 9, wherein the communication parameters of the first network node comprise: at least one parameter of a data link to the first network node, and wherein the means for estimating comprises: a means for estimating the at least one parameter using a link capacity of the data link.

12. The apparatus of claim 9, wherein the advertisement message comprises any of at least one network parameter and at least one node parameter.

13. The apparatus of claim 12, wherein any of the at least one network parameter and the at least one node parameter comprises a node identifier.

14. The apparatus of claim 13, wherein the means for exchanging at least one second unicast message comprises:
means for receiving, from the first network node in the at least one slot at a fourth time, a third unicast message that comprises the pre-admission information; and
means for transmitting, to the first network node in the at least one slot at a fifth time, a fourth unicast message that comprises the pre-authentication information, wherein the means for transmitting transmits the fourth unicast message responsive to the third unicast message.

15. The apparatus of claim 9, further comprising: means for generating, for transmission to the first network node in the given slot at a third time, a third unicast message for causing the handover to a protocol for admittance to the mesh network.

16. A system comprising:
a mesh network comprising-first and second network nodes that are operable to communicate using a scheduled communications protocol; and
a given node seeking to establish pre-admittance to the mesh network via a link between the first node and the given node, wherein the given node comprises:
means for listening for an advertisement message broadcast at a first time in a given slot of a communication channel between first and second network nodes, wherein the advertisement message comprises an identifier of the first network node;
means for determining, from the advertisement message, an indicia of proximity from the first network node;
means for selecting the first network node to communicate with, via the given slot based upon the indicia of proximity;
means for estimating communication parameters of the first network node;
means for transmitting, to the first network node in the given slot at a second time, a first unicast message comprising a request for negotiating pre-admittance to the mesh network; and
means for exchanging, prior to handover to a protocol for admittance to the mesh network, at least one second unicast message with the first network node, in the given slot at at least one third time, to exchange any of pre-admission information and pre-authentication information.

17. The system of claim 16, wherein the means for determining an indicia of proximity comprises: means for calculating received signal strength information for the first network.

18. The system of claim 17, wherein the communication parameters of the given network node comprise: at least one parameter of a data link to the first network node, and wherein the means for estimating comprises: a means for estimating the at least one parameter using a link capacity of the data link.

19. The system of claim 16, wherein the advertisement message comprises any of at least one network parameter and at least one node parameter.

20. The system of claim 16, wherein any of the at least one network parameter and the at least one node parameter comprises a node identifier.

21. The system of claim 20, wherein the means for exchanging at least one second unicast message comprises:
means for receiving from the first network node in the given slot at a fourth time, a third unicast message that comprises the pre-admission information; and
means for transmitting to the first network node in the given slot at a fifth time, a fourth unicast message that comprises pre-authentication information, wherein the means for transmitting transmits the fourth unicast message responsive to the third unicast message.

* * * * *